Dec. 3, 1957     S. J. ANTALIS ET AL     2,815,491
INDUCTIVE DEVICE
Filed Aug. 14, 1956     2 Sheets-Sheet 1
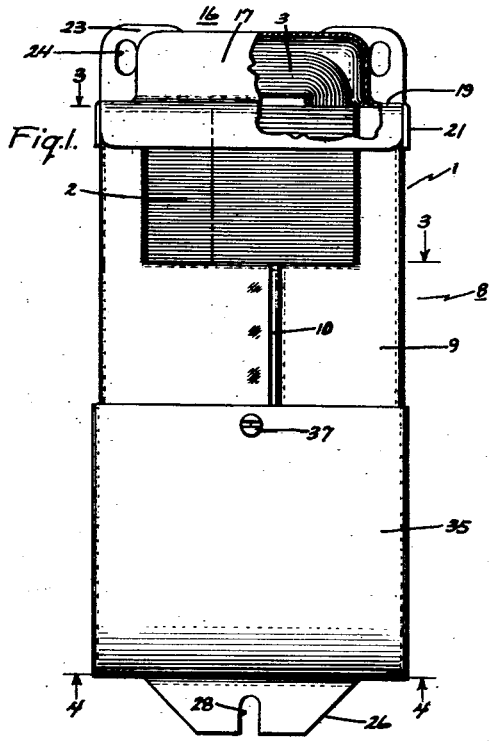
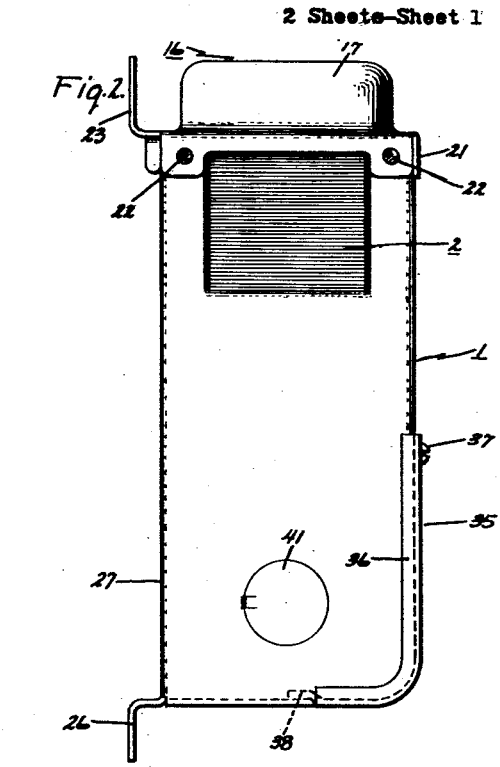
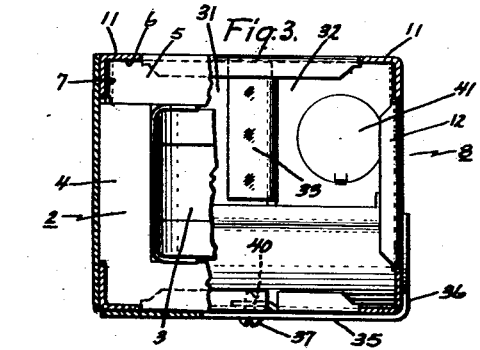
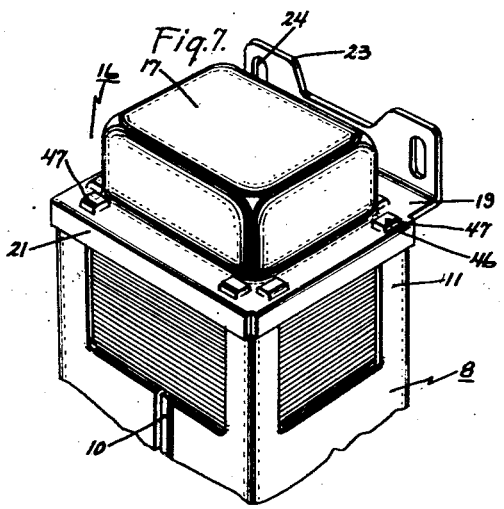
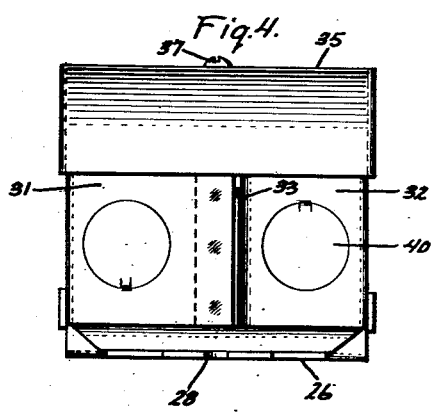
Inventors:
Stanley J. Antalis,
Myrle O. Marsh,
Elmer J. Zelt,
by Robert G. Irish
Their Attorney.

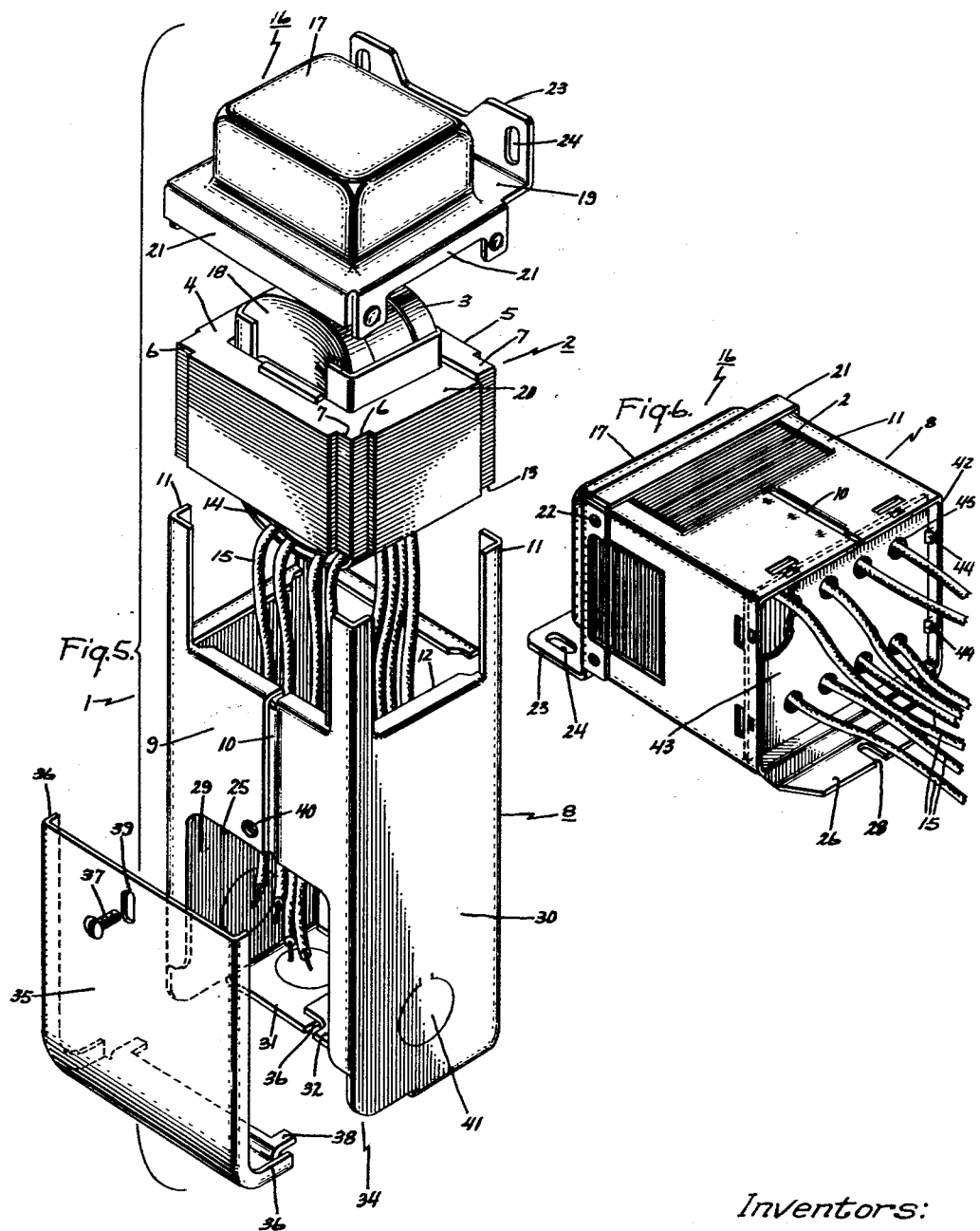

United States Patent Office 2,815,491
Patented Dec. 3, 1957

2,815,491

INDUCTIVE DEVICE

Stanley J. Antalis and Myrle O. Marsh, Fort Wayne, Ind., and Elmer J. Zelt, Arcadia, Calif., assignors to General Electric Company, a corporation of New York Application August 14, 1956, Serial No. 604,038

2 Claims. (Cl. 336—98)

This invention relates to inductive devices, such as transformers, and more particularly to the mechanical assembly thereof.

Transformers of the air cooled type, particularly in the smaller ratings, are conventionally provided with a core formed of a plurality of relatively thin laminations of magnetic material with appropriate coils arranged thereon. The core and coil assembly of these transformers is frequently arranged with the edges of the laminations exposed with a sleeve member arranged abutting one end of the core and enclosing the exposed end of the coils at that end, thus defining a junction box compartment for making electrical connections to the coils. An end cap member abuts the sleeve member on the side thereof remote from the core, and another end cap member abuts the other end of the core and encloses the other exposed end of the coils. A cover member commonly closes an aperture in the first end cap member thus providing access to the junction box compartment. In the past, these elements have been held in assembled relation and the core laminations clamped together by means of a plurality of through-bolts which respectively engage the end cap members, these through-bolts extending respectively through holes formed in the core. These prior constructions have had the disadvantage of appreciable electrical losses due to the holes in the core and the through-bolts. The through-bolt holes cause losses since the burrs formed around each hole in the punching operation short circuit adjacent laminations causing eddy currents and furthermore the holes are usually necessarily located in the flux path, thus reducing the cross sectional area of the core available for carrying flux and causing fringing of the flux. In addition, the through-bolts short circuit the laminations and these bolts with their attached end caps and covers provide one or more short circuited turns in which circulating current may flow. Furthermore, these previous constructions have involved the use of a relatively large number of parts and thus required expensive assembly operations.

It is therefore desirable to provide a construction for an inductive device, such as a transformer in which the various elements are held in assembled relation and the core laminations are clamped without the use of through-bolts.

A construction which eliminates through-bolts is proposed in application Serial No. 478,607 of Herman R. Korte, filed December 30, 1954 and assigned to the assignee of the present application. That application discloses a construction in which the end cap and sleeve members and the core and coil assembly are held in assembled relation by one or more strap members extending between the end cap members on the exterior of the core, these strap members being integrally joined to the end cap members, as by welding. While the construction of the aforesaid Korte application does eliminate through-bolts and the resulting electrical losses, it requires a number of welding operations at different parts of the assembly and still requires the same number of component parts as previous constructions. It is therefore desirable to provide a construction for an inductive device such as a small transformer, which not only eliminates through-bolts, but which also reduces the number of component parts to a minimum and permits ready assembly.

It is, therefore, an object of this invention to provide an improved construction for an inductive device which eliminates through-bolts and reduces the number of component parts from that required in previous constructions.

A further object of this invention is to provide an improved construction for an inductive device incorporating the desirable features set forth above.

Further objects and advantages of this invention will become apparent by reference to the following description and the accompanying drawings, and the features of novelty which characterize this invention will be pointed out with particularity in the claims annexed to and forming a part of this specification.

This invention in one of its aspects provides an inductive device comprising a core formed of a plurality of laminations and having a coil arranged thereon. A sleeve member having a plurality of integral longitudinally extending projections is provided, the sleeve member having inwardly extending flanges formed intermediate the projections. The core is positioned between the sleeve member projections with one end abutting the sleeve member flanges and with the projections respectively engaging the laminated edge of the core. An end cap member is arranged abutting the other end of the core and is connected to the sleeve member projections so that the core laminations are tightly clamped together.

In the drawings, Fig. 1 is a top view, partly broken away, showing a transformer incorporating the preferred embodiment of this invention;

Fig. 2 is a side view of the transformer of Fig. 1;

Fig. 3 is a cross sectional view taken along the line 3—3 of Fig. 1;

Fig. 4 is a bottom view of the transformer of Fig. 1 viewed along the line 4—4 thereof;

Fig. 5 is an exploded view in perspective of the improved transformer construction of Fig. 1;

Fig. 6 is a view in perspective, partly broken away, showing a modification of the preferred embodiment of Fig. 1; and Fig. 7 is a fragmentary view in perspective illustrating another modification of this invention.

Referring now to Figs. 1 through 5 of the drawings, there is shown by way of example, a transformer 1 having a core 2 formed of a stacked plurality of substantially rectangular laminations of relatively thin magnetic material. The core 2 is shown as being of the shell type, i. e., having magnetic portions surrounding the coil 3, which is assembled thereon. In the illustrated embodiment, core 2 is formed of a plurality of E-shaped laminations 4 and I-shaped laminations 5, interleaved as shown, with coil 3 arranged on the middle legs of the E-shaped laminations 4. While a single coil 3 is shown in the drawings, it will be readily understood that this coil may include primary and secondary windings or that separate coils may be provided, the arrangement of coils on the core 2 not being a part of this invention.

Referring now particularly to Fig. 5, it will be seen that each side of the laminated edge of the core 2 has a pair of transversely extending notches 6 and 7 extending respectively to the corners of the laminated edge. The purpose of these notches will become apparent below. A sleeve member 8 is provided formed of a single piece of relatively thin sheet material, such as steel, and having a rectangular cross section substantially conforming to the configuration of the laminations of the core member 2. It will be seen that one side 9 of sleeve member 8 has an over-lapping joint as at 10. Sleeve member 8 has integral angle-shaped projections 11 respectively extending longitudinally from its corners at one end thereof, is best seen in Fig. 5, and inwardly extending flanges 12 are respectively formed intermediate the projections 11.

The core and coil assembly 2 and 3 is arranged between sleeve member projections 11 with end lamination 13 of core 2 abutting flanges 12 of sleeve member 8. It is thus readily apparent that the end 14 of coil 3 and the electrical leads 15 attached thereto are enclosed by sleeve member 8. When thus positioned, the angle-shaped projections 11 of sleeve member 8 are respectively seated in notches 6 and 7 in core member 2 and are thus in engagement with the laminated edge of the core.

An end cap 16 is provided, formed of suitable material, such as sheet steel, and has a portion 17 formed to enclose the other end 18 of coil 3. End cap member 16 has a relatively flat peripheral portion 19 which abuts the other end lamination 20 of core 2 with longitudinally extending flanges 21 formed on three edges thereof. Flanges 21 embrace the outer surfaces of angle-shaped projections 11 of sleeve member 8 and are integrally connected thereto, as by projection welding, as at 22. Another longitudinally extending flange 23 is formed on the fourth side of peripheral portion 19 of end cap member 16 extending oppositely from flanges 21. Flange 23 may be provided with suitable openings 24 in order to form one mounting foot for the transformer 1.

The side 9 of sleeve member 8 has a recess 25 formed therein communicating with the end of sleeve member 8 remote from core 2. A longitudinally extending flange 26 is formed from side 27 of sleeve member 8 opposite from side 9 and may be provided with a suitable opening 28 thereby forming the other mounting foot for the transformer 1. The other sides 29 and 30 of sleeve member 8 have portions 31 and 32 extending respectively therefrom and joined by an over-lapping joint 33 thereby forming an end wall for the sleeve member 8. It will be noted that portions 31 and 32 do not extend the complete height of sides 29 and 30 as sleeve member 8 thereby defining an opening 34 at the end of sleeve member 8 corresponding to the opening defined by recess 25 in side 9. A cover plate 35 is provided having a generally L-shaped configuration for covering opening 34 and the opening defined by recess 25 in side 9 of sleeve member 8. Cover plate 35 has flanges 36 formed on the sides thereof engaging sides 29 and 30 respectively of sleeve member 8 and projections 38 formed at one end which engage the interior surfaces of portions 31 and 32 of sides 29 and 30. Cover plate 35 is held in position by a suitable screw 37 extending through opening 39 and engaging a taped hole 40 in side 9 of sleeve member 8. Sides 29 and 30 and their portions 31 and 32 may be provided with suitable knock-outs 41 as shown for admitting electrical wiring to the interior of sleeve member 8. It will be seen that cover plate 35 provides ready access to the interior of sleeve member 8 for making electrical connections to the leads 15.

It will be readily seen that the construction shown in Figs. 1 to 5 provides a construction for an inductive device utilizing only three components in addition to the core and coil assembly, i. e., sleeve member 8, end cap member 16 and cover plate 35. It will also be readily apparent that the device may be readily and quickly assembled and that only one welding operation is involved, i. e., in attaching flanges 21 of cover member 16 to the angle-shaped projections 11 of sleeve member 8.

Referring now to Fig. 6 in which like elements are indicated by like reference numerals, it will be seen that the end of sleeve member 8 remote from core 2 is open, as at 42. A sheet of suitable insulating material 43 is positioned in and closes opening 42 and is held in position by means of suitable tabs 44 bent from the sides of sleeve member 8. Sheet 43 is provided with suitable openings 45 through which the electrical leads 15 extend. The construction shown in Fig. 6 may appropriately be used in installations where the transformer is installed within another enclosing casing, such as, in a control assembly for machine tools in which the transformer is mounted along with other equipment within a single enclosing housing, whereas a construction of Fig. 1 may be preferred in installations where the transformer is utilized at an isolated location which is not within another enclosing housing.

Referring now to Fig. 7, in which like elements are again indicated by like reference numerals, it is seen that end cap member 16 is connected to angle-shaped projections 11 of sleeve member 8 in a manner different from the embodiment of Figs. 1 through 5. Here, peripheral portion 19 of end cap member 16 is provided with a plurality of openings 46 and the ends of angle-shaped projections 11 are provided respectively with tabs 47 which extend through openings 46 and are bent over to engage portion 19 thereby clamping the laminations of the core 2.

While the constructions described above have been illustrated and described in connection with transformers, it will be readily understood that this invention is equally applicable to other inductive devices such as reactors, or ballasts for arc discharge lamps. We desire it to be understood therefore that the specific embodiments shown are by way of example and we intend in the appended claims to cover all modifications which do not depart from the spirit and scope of this invention.

What we claim as new and desire to secure by Letters Patent of the United States is:

1. An inductive device comprising a core formed of a plurality of substantially rectangular laminations and having at least one coil thereon, each side of the laminated edge of said core having a pair of transversely extending notches extending respectively to the corners of said laminated edge, a sleeve member having a rectangular cross section substantially conforming to the configuration of said core laminations, said sleeve member having a plurality of integral angle-shaped projections respectively extending longitudinally from the corners thereof, said sleeve member having inwardly extending flanges formed thereon respectively intermediate said projections, said core being positioned between said sleeve member projections with one end lamination thereof abutting said sleeve member flanges, said sleeve member projections respectively being seated in said notches in said laminated edge of said core, and an end cap member abutting the other end lamination of said core and connected to said sleeve member projections thereby tightly clamping said core laminations.

2. An inductive device comprising a core formed of a plurality of substantially rectangular laminations and having at least one coil thereon, said coil having electrical leads attached thereto, each side of the laminated edge of said core having a pair of transversely extending notches extending respectively to the corners of said laminated edge, a sleeve member formed of a single piece of sheet material having a rectangular cross section substantially conforming to the configuration of said core laminations and with an over-lapped joint on one side thereof, said sleeve member having a plurality of integral angle-shaped projections respectively extending longitudinally from the corners of one end thereof, said one end of said sleeve member having inwardly extending flanges respectively intermediate said projections, said core being positioned between said sleeve member projections with one end lamination abutting said sleeve member flanges so that one end of said coil and said leads are enclosed by said sleeve member, said sleeve member projections being respectively seated in said notches in said laminated edge of said core, an end cap member enclosing the other end of said coil and abutting the other end of said core, said end cap member having longitudinally extending flanges formed on at least two sides thereof engaging the outer surface of said sleeve member projections and secured thereto by integral connections thereby tightly clamping said core laminations, said end cap member having another flange formed on another side thereof extending oppositely from said first named end cap member flanges and forming a mounting foot, said sleeve member having a longitudinally extending flange formed at its other end from its side opposite from said one side and forming another mounting foot, the other two sides of said sleeve member having portions extending therefrom at said other end thereof forming an end wall for said sleeve member, said one side of said sleeve member having a recess formed therein communicating with said other end, and a cover plate closing said recess and removably secured to said sleeve member thereby closing said other end of said sleeve member and providing access to said leads.

References Cited in the file of this patent
UNITED STATES PATENTS

| | | |
|---|---|---|
| 1,647,372 | Pressley | Nov. 1, 1927 |
| 2,740,905 | Henderson | Apr. 3, 1956 |
| 2,741,528 | Clark | Apr. 10, 1956 |